(12) United States Patent
Chuah et al.

(10) Patent No.: US 7,800,322 B2
(45) Date of Patent: Sep. 21, 2010

(54) ISOLATION CIRCUIT FOR DC POWER SOURCES

(75) Inventors: Yew-tat Chuah, Singapore (SG);
Kian-teck Teo, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 594 days.

(21) Appl. No.: 11/520,842

(22) Filed: Sep. 13, 2006

(65) Prior Publication Data
US 2007/0194744 A1    Aug. 23, 2007

(30) Foreign Application Priority Data
Sep. 15, 2005    (SG) ............... 200505954-8

(51) Int. Cl.
*H02P 7/06* (2006.01)
*G11B 21/02* (2006.01)

(52) U.S. Cl. .............. 318/254; 318/280; 318/738; 318/782; 360/75; 360/82; 361/90

(58) Field of Classification Search ......... 318/254, 318/430, 432, 434, 280, 738, 782; 388/801; 180/412, 443, 446; 360/75, 82; 326/123; 361/90
See application file for complete search history.

(56) References Cited

U.S. PATENT DOCUMENTS

| | | | | |
|---|---|---|---|---|
| 4,864,214 A * | 9/1989 | Billings et al. | ............... | 323/289 |
| 5,261,501 A * | 11/1993 | Tsuchiya et al. | ............ | 180/412 |
| 5,530,788 A * | 6/1996 | Saijima | .................. | 388/811 |
| 5,686,814 A * | 11/1997 | Wierzbicki | .................. | 307/51 |
| 5,914,582 A * | 6/1999 | Takamoto et al. | ........... | 318/801 |
| 5,945,816 A * | 8/1999 | Marusik | .................... | 323/273 |
| 6,194,792 B1 * | 2/2001 | Yanou et al. | ............... | 307/10.1 |
| 6,213,249 B1 * | 4/2001 | Noro et al. | ................... | 180/446 |
| 6,213,571 B1 * | 4/2001 | Yamada et al. | ............. | 303/152 |
| 6,288,187 B1 * | 9/2001 | Armand | ...................... | 526/240 |
| 6,332,506 B1 * | 12/2001 | Kifuku | ....................... | 180/443 |
| 6,384,567 B1 * | 5/2002 | Maeda | ........................ | 318/801 |
| 6,407,524 B1 * | 6/2002 | Endo et al. | ................... | 318/432 |
| 6,410,997 B1 * | 6/2002 | Sjursen et al. | .............. | 307/130 |
| 6,420,906 B1 * | 7/2002 | Kohda | .......................... | 326/114 |
| 6,459,972 B2 * | 10/2002 | Kodaka et al. | ................ | 701/43 |
| 6,469,564 B1 * | 10/2002 | Jansen | ......................... | 327/365 |
| 6,600,239 B2 * | 7/2003 | Winick et al. | ................. | 307/85 |
| 6,643,572 B2 * | 11/2003 | Kohge et al. | .................. | 701/41 |
| 6,696,807 B2 * | 2/2004 | Iwata et al. | ................. | 318/432 |
| 6,719,089 B2 * | 4/2004 | Yoneda et al. | .............. | 180/446 |
| 6,747,880 B2 * | 6/2004 | Grover | .................... | 363/21.06 |
| 6,837,331 B2 * | 1/2005 | Kawada et al. | .............. | 180/446 |
| 6,879,121 B2 * | 4/2005 | Haussecker et al. | ......... | 318/280 |
| 6,917,169 B2 * | 7/2005 | Nagasawa et al. | ........... | 318/280 |
| 6,972,918 B2 * | 12/2005 | Kokami et al. | ................ | 360/75 |

(Continued)

*Primary Examiner*—Paul Ip
(74) *Attorney, Agent, or Firm*—Lisa K. Jorgenson; William A. Munck

(57) ABSTRACT

The electrical isolation circuit of the present disclosure includes a switch coupled between the DC power source and the electrical application and a comparator for controlling the switch by receiving inputs from the DC power source and the electrical application. The comparator causes the switch to switch ON when the DC power source has a higher voltage than the electrical application allowing the normal operation of the electrical application. However, when the electrical application has a higher voltage than the DC power source, the comparator causes the switch to switch OFF thereby preventing flow of current from the electrical application to the DC power source.

20 Claims, 2 Drawing Sheets

U.S. PATENT DOCUMENTS

| | | | |
|---|---|---|---|
| 6,973,992 B2 * | 12/2005 | Yoneda et al. | 180/446 |
| 6,987,333 B2 * | 1/2006 | Winick et al. | 307/85 |
| 6,987,371 B2 * | 1/2006 | Kifuku | 318/432 |
| 6,988,027 B2 * | 1/2006 | Yuda et al. | 701/41 |
| 6,995,567 B2 * | 2/2006 | Kawashima et al. | 324/522 |
| 7,009,349 B2 * | 3/2006 | Nagase et al. | 318/133 |
| 7,015,665 B2 * | 3/2006 | Ohshima | 318/280 |
| 7,027,315 B2 * | 4/2006 | Halfmann et al. | 363/56.02 |
| 7,054,089 B2 * | 5/2006 | Kokami | 360/73.03 |
| 7,106,012 B2 * | 9/2006 | Matsuda et al. | 318/139 |
| 7,142,038 B2 * | 11/2006 | Baglin | 327/407 |
| 7,158,332 B2 * | 1/2007 | Kokami | 360/75 |
| 7,165,646 B2 * | 1/2007 | Kifuku et al. | 180/446 |
| 7,176,651 B2 * | 2/2007 | Kifuku et al. | 318/801 |
| 7,257,475 B2 * | 8/2007 | Asaumi et al. | 701/43 |
| 7,294,985 B2 * | 11/2007 | Kifuku | 318/432 |
| 7,336,047 B2 * | 2/2008 | Ueda et al. | 318/432 |
| 7,379,282 B1 * | 5/2008 | Zansky | 361/82 |
| 2002/0024317 A1 * | 2/2002 | Amakusa et al. | 318/782 |
| 2002/0039034 A1 * | 4/2002 | Kohda | 326/123 |
| 2002/0113494 A1 * | 8/2002 | Winick et al. | 307/85 |
| 2002/0135235 A1 * | 9/2002 | Winick et al. | 307/87 |
| 2003/0227707 A1 * | 12/2003 | Kokami et al. | 360/75 |
| 2004/0041472 A1 * | 3/2004 | Chan et al. | 307/64 |
| 2004/0100722 A1 * | 5/2004 | Kokami | 360/75 |
| 2004/0130913 A1 * | 7/2004 | Giandalia et al. | 363/16 |
| 2004/0145843 A1 * | 7/2004 | Winick et al. | 361/90 |
| 2005/0280313 A1 * | 12/2005 | Baglin | 307/66 |
| 2006/0072237 A1 * | 4/2006 | Kokami | 360/75 |
| 2006/0087266 A1 * | 4/2006 | Krenzke et al. | 318/254 |
| 2006/0212137 A1 * | 9/2006 | Sone | 700/22 |
| 2006/0282703 A1 * | 12/2006 | Nam | 714/14 |

* cited by examiner

ISOLATION CIRCUIT FOR DC POWER SOURCES

CROSS-REFERENCE TO RELATED APPLICATION AND CLAIM OF PRIORITY

The present application is related to Singapore Patent No. 200505954-8 filed Sep. 15, 2005, entitled "AN ELECTRICAL ISOLATION CIRCUIT FOR PREVENTING CURRENT FLOW FROM AN ELECTRICAL APPLICATION TO A DC POWER SOURCE". Singapore Patent No. 200505954-8 is assigned to the assignee of the present application and is hereby incorporated by reference into the present disclosure as if fully set forth herein. The present application hereby claims priority under 35 U.S.C. §119(a) to Singapore Patent No. 200505954-8.

TECHNICAL FIELD

The present disclosure relates to electrical isolation of DC power sources and, in particular, to systems for preventing current flow from an electrical application to a DC power source.

BACKGROUND

During operation of certain types of electrical applications, the voltages generated may exceed the voltage of the DC power supply in use. Thus, current flows from the electrical application into the DC power supply. This may result in damage to the DC power supply in, for example, electrical applications with inductive loads such as DC motors.

In particular, brushless DC motors (BLDC) require commutation for correct and efficient operation. Commutation is achieved in BLDC motors by controlling several switches configured to switch ON and OFF at predetermined intervals and thus controls the commutation of the stator coils of the BLDC motor. Conventional BLDC systems may employ such switches as a semiconductor switch implemented on an integrated circuit (IC).

In most electrical applications, when the electrical application is turned OFF, the DC power supply is isolated from the electrical application. However, in BLDC motors back an electric and magnetic field (EMF) is generated by the commutation of the stator coils. When the BLDC motor is turned OFF or when there is a loss of power, the back EMF generated can induce current that is driven back into the DC power supply. The DC power supply may thus be damaged by the induced current. Such electrical applications thus require electrical isolation from the DC power supply to prevent damage to the power supply during normal operations. Typically, electrical isolation is accomplished by a Shottky diode or MOSFET between the power supply and the electrical application.

FIG. 1 depicts a conventional implementation of an electrical isolation for BLDC motor 20 using MOSFET 12. Using this implementation, there is a low voltage drop across the MOSFET 12 that keeps the voltage supplied to the electrical application high. The power dissipation by MOSFET 12 is also relatively low. However, this implementation does not fully prevent the back flow of induced current into DC power source 10. When the MOSFET 12 is switched OFF, electrical isolation occurs and induced current may not flow from BLDC motor 20 back into DC power source 10. However, when MOSFET 12 is switched ON during normal operations, any induced current due to back EMF in BLDC motor 20 can still back flow into DC power source 10.

Referring to FIG. 2, another conventional implementation of electrical isolation for BLDC motor 20 is depicted using a Shottky diode 17. Shottky diode 17 allows only uni-directional current flow and thus results in electrical isolation of DC power source 10 from the electrical application, in this case BLDC motor 20. However, using Shottky diode 17 results in a high voltage drop across Shottky diode 17 as well as high power dissipation.

There is therefore a need for an improved system of providing electrical isolation for applications that may generate voltages in excess of the DC power supply.

SUMMARY

The present disclosure seeks to provide an electrical isolation circuit for preventing the flow of current from an electrical application to a DC power source.

In one embodiment, the present disclosure is an electrical isolation circuit. The isolation circuit includes a switch coupled between DC power source and an electrical application. The isolation circuit also includes a comparator configured to receive inputs from the DC power source and the electrical application. The comparator causes the switch to switch OFF when the electrical application has a higher voltage than the DC power source, thereby preventing flow of current from the electrical application to the DC power source.

In another embodiment, the present disclosure is an electrical isolation circuit. The electrical isolation circuit includes a MOSFET operating as a switch and coupled between a DC power source and an electrical application. The electrical isolation circuit also includes an op-amp operating as a comparator for controlling the MOSFET, by receiving inputs from the DC power source and the electrical application. The op-amp causes the MOSFET to switch OFF when the electrical application has a higher voltage than the DC power source, thereby preventing flow of current from the electrical application to the DC power source.

In still another embodiment, the present disclosure is a method for electrical isolation of a DC power source from an electrical application. The method includes providing a switch coupled between the DC power source and the electrical application and providing a comparator for controlling the switch by comparing inputs from the DC power source and the electrical application. The method also includes switching the switch OFF when the electrical application has a higher voltage than the DC power source, thereby preventing flow of current from the electrical application to the DC power source.

In yet another embodiment, the present disclosure is a brushless DC (BLDC) motor system having an electrical isolation circuit. The BLDC motor system includes a DC power source and a BLDC motor having a plurality of commutation switches configured to switch ON or OFF at predetermined intervals to control commutation of stator coils of the BLDC motor. The BLDC motor system also includes an electrical isolation circuit. The electrical isolation circuit includes a switch coupled between the DC power source and the BLDC motor and a comparator for controlling the switch by receiving inputs from the DC power source and the BLDC motor. The comparator causes the switch to switch OFF when the electrical application has a higher voltage than the DC power source, thereby preventing flow of current from the BLDC motor to the DC power source.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 3:
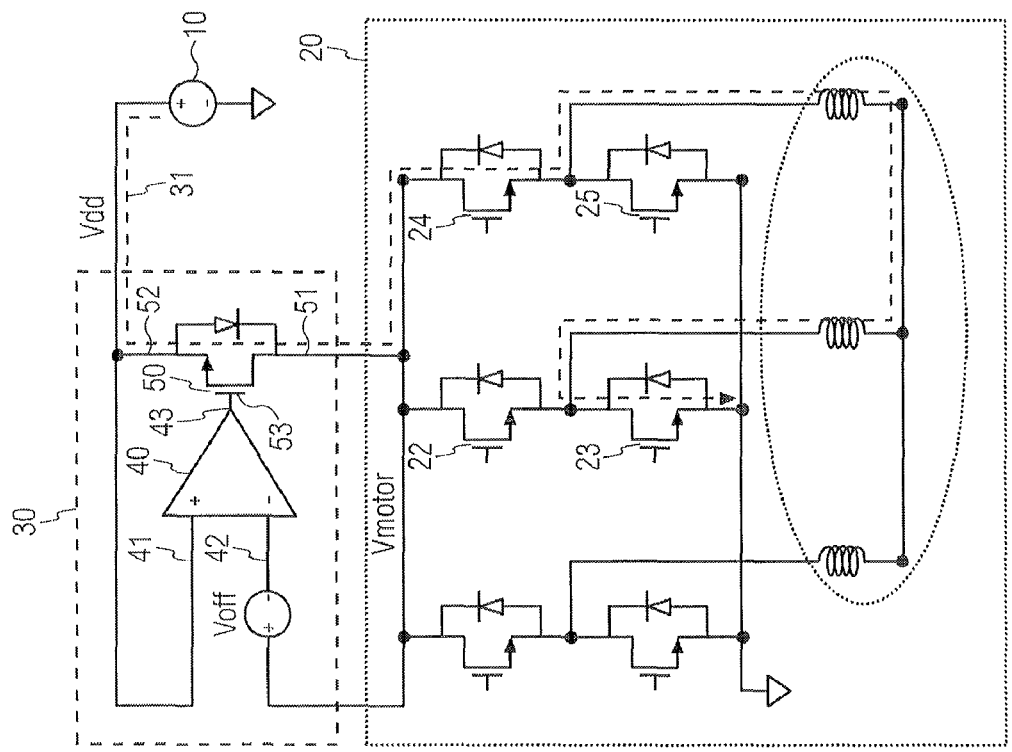
FIG. 3 illustrates a circuit diagram of an electrical isolation circuit in accordance with one embodiment of the present invention in which the circuit does not provide electrical isolation.

FIG. 3 is an electrical isolation circuit 30 in accordance with one embodiment of the present disclosure. Electrical isolation circuit 30 is coupled to electrical application 20. For example, electrical application 20 may be any suitable application such as, for example, a brushless DC motor (BLDC). Electrical isolation circuit 30 includes MOSFET 50 operating as a switch and op-amp 40 operating as a comparator.

MOSFET 50 acts as a switch between DC power source 10 and electrical application 20. When MOSFET 50 is switched OFF, DC power source 10 is isolated from electrical application 20. Drain 51 of MOSFET 50 is coupled to electrical application 20, while source 52 of MOSFET 50 is coupled to DC power source 10. Gate 53 of MOSFET 50 is coupled to output 43 of op-amp 40. Op-amp 40 operates as a comparator and provides the control for switching MOSFET 50 ON or OFF.

Positive input 41 of op-amp 40 is coupled to DC power source 10 while negative input 42 of op-amp 40 is coupled to electrical application 20. Op-amp 40 operates as a comparator and thus receives voltage input from DC power source 10 and electrical application 20.

During operation of electrical application or BLDC motor 20, a plurality of commutation switches are utilized to control the commutation of the motors of electrical application or BLDC motor 20. The plurality of commutation switches are configured to switch ON or OFF at predetermined intervals to control the commutation of the stator coils of electrical application or BLDC motor 20. The commutation switches used in electrical application or BLDC motor 20 may be semiconductor switches implemented on integrated circuits (ICs).

When starting electrical application BLDC motor 20, MOSFET 50 operating as a switch is OFF. Commutation switches 23 and 24 are then switched ON. This results in current 31 flowing from DC power source 10 via an intrinsic diode or body diode of MOSFET 50 through commutation switches 24 and 23 and then to ground. Voltage (Vmotor) of electrical application or BLDC motor 20 is voltage (Vdd) of DC power source 20 minus voltage drop across the body diode of MOSFET 50. Op-amp 40 thus receives a higher voltage input at its positive input 41 compared to negative input 42 which is Vdd minus voltage drop across the body diode of MOSFET 50. Output 43 of op-amp 40 returns a high output forcing MOSFET 50 to switch ON. This allows the current 31 to be fully delivered from DC power source 10 through the commutation switches 24 and 23 to the stator of electrical application or BLDC motor 20.

Figure 1:
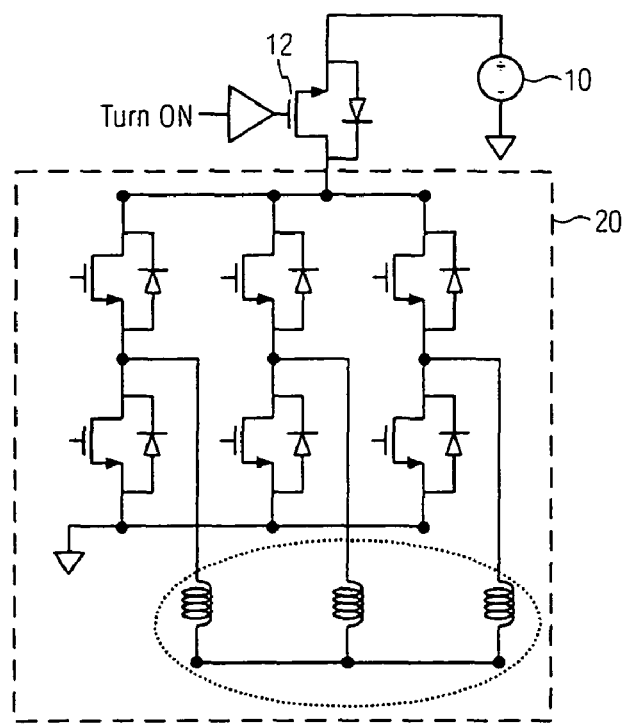
FIG. 1 illustrates a circuit diagram of a conventional implementation of electrical isolation using a MOSFET between a power supply and an electrical application.
Figure 2:
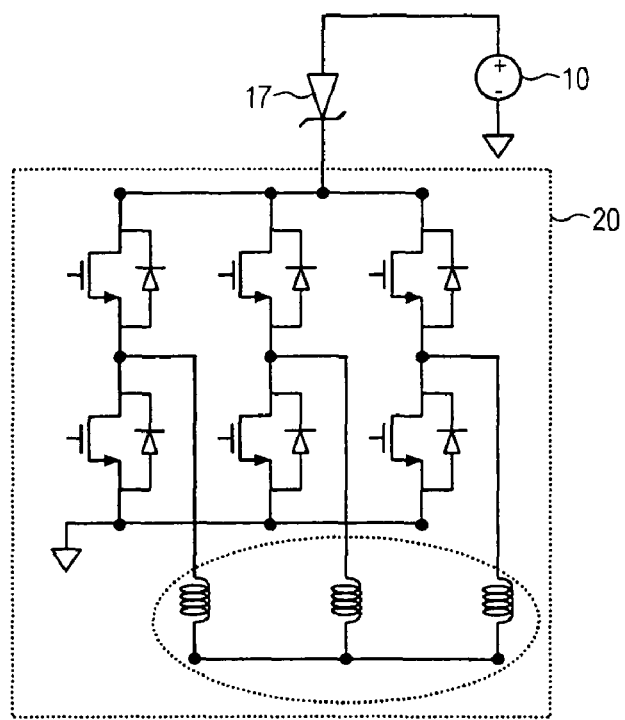
FIG. 2 illustrates a circuit diagram of a conventional implementation of electrical isolation using a Shottky diode between a power supply and an electrical application.
Figure 4:
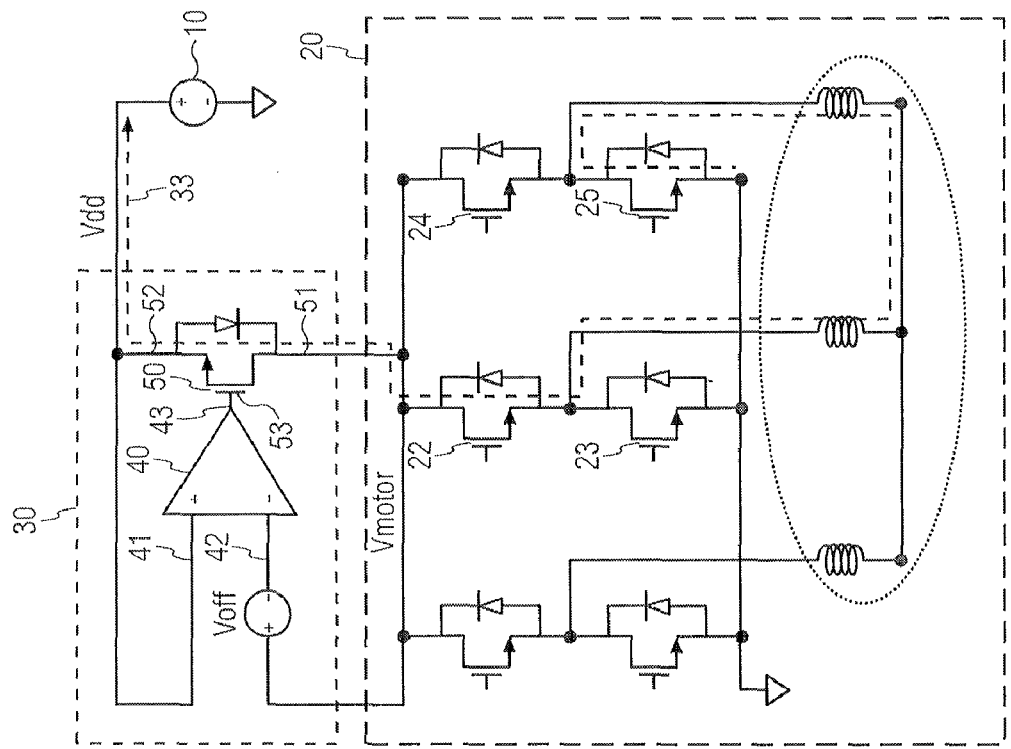
FIG. 4 illustrates a circuit diagram of an electrical isolation circuit according to one embodiment of the disclosure in which the circuit provides electrical isolation.

At a next interval, commutation switches 24 and 23 are initially ON but are now switched OFF. Referring to FIG. 4, as current in electrical application or BLDC motor 20 cannot decay instantly when switches 24 and 23 are switched OFF, back EMF develops within electrical application or BLDC motor 20 inducing current 33 to flow back into DC power source 10. Induced current 33 will flow from ground to DC power source 10 through the body diode of commutation switch 25, the body diode of commutation switch 22 and through the ON resistance of MOSFET 50. This causes voltage (Vmotor) of electrical application or BLDC motor 20 to be higher than voltage (Vdd) of DC power source 10. Op-amp 40 thus receives a higher voltage at negative input 42 than positive input 41. Output 43 of op-amp 40 thus begins to return a low output as opposed to its earlier high output. As output 43 of op-amp 40 decreases, the ON resistance of MOSFET 50 increases until MOSFET 50 switches OFF and completely isolates DC power source 10 from electrical application or BLDC motor 20.

Accordingly, embodiments of electrical isolation circuit 30 of the present disclosure provide electrical isolation of electrical application 20, preventing current flow from electrical application 20 back into DC power source 10 thereby damaging it. By using comparator 40 and a switch (such as MOSFET 50), the present disclosure provides real time dynamic electrical isolation as and when there is a requirement for electrical isolation. Comparator (such as op-amp 40) compares the voltage of DC power source 10 and the voltage of electrical application 20.

During normal operations, the voltage of DC voltage source 10 should always be higher than the voltage of electrical application 20. The comparator would then provide an output to the switch to switch it ON. Accordingly, DC power source 10 provides current to electrical application 20. However, when the voltage of electrical application 20 rises above the voltage of DC voltage source 10 and causes current to flow back into DC power source 10, the comparator would then provide an output to the switch to switch it OFF. Accordingly, an electrical isolation to prevent the flow of current back into DC power source 10 is provided.

While the present description refers to the electrical application being a brushless DC motor (BLDC). It should be understood that the present disclosure may be practiced with a variety of other electrical applications that require electrical isolation when excessive voltages are generated within the electrical application.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. An electrical isolation circuit comprising:
   a switch coupled between DC power source and an electrical application; and
   a comparator configured to receive inputs from the DC power source and the electrical application;
   wherein the comparator causes the switch to switch OFF when a voltage from the electrical application rises above a voltage from the DC power source, thereby preventing flow of current from the electrical application to the DC power source.

2. The electrical isolation circuit of claim 1, wherein the comparator causes the switch to switch ON when the DC power source has a higher voltage than the electrical application.

3. The electrical isolation circuit of claim 1, wherein the switch comprises:
   a MOSFET having a gate, a drain, and a source, and wherein the comparator comprises an op-amp having a positive input, a negative input and an output.

4. The electrical isolation circuit of claim 3, wherein the output of the op-amp is coupled to the gate of the MOSFET, the positive input of the op-amp is coupled to the DC power source and the negative input of the op-amp is coupled to the electrical application.

5. The electrical isolation circuit of claim 4, wherein the drain of the MOSFET is coupled to the electrical application and the source of the MOSFET is coupled to the DC voltage source.

6. The electrical isolation circuit of claim 1, wherein the comparator is an op-amp.

7. An electrical isolation circuit comprising:
   a MOSFET operating as a switch and coupled between a DC power source and an electrical application; and
   an op-amp operating as a comparator for controlling the MOSFET, by receiving inputs from the DC power source and the electrical application;
   wherein the op-amp causes the MOSFET to switch OFF when a voltage from the electrical application rises above a voltage from the DC power source, thereby preventing flow of current from the electrical application to the DC power source.

8. The electrical isolation circuit of claim 7, wherein the op-amp causes the MOSFET to switch ON when the DC power source has a higher voltage than the electrical application.

9. The electrical isolation circuit of claim 7, wherein an output of the op-amp is coupled to a gate of the MOSFET, a positive input of the op-amp is coupled to the DC power source and a negative input of the op-amp is coupled to the electrical application.

10. The electrical isolation circuit of claim 7, wherein a drain of the MOSFET is coupled to the electrical application and a source of the MOSFET is coupled to the DC voltage source.

11. A method for electrical isolation of a DC power source from an electrical application, comprising the steps:
    providing a switch coupled between the DC power source and the electrical application;
    providing a comparator for controlling the switch by comparing inputs from the DC power source and the electrical application; and
    switching the switch OFF when a voltage from the electrical application rises above a voltage from the DC power source, thereby preventing flow of current from the electrical application to the DC power source.

12. The method of claim 11 further comprising:
    switching the switch ON when the DC power source has a higher voltage than the electrical application.

13. The method of claim 11, wherein the switch comprises a MOSFET having a gate, drain and source and wherein the comparator comprises an op-amp having a positive input, a negative input and an output.

14. The method of claim 13, wherein the output of the op-amp is coupled to the gate of the MOSFET, the positive input of the op-amp is coupled to the DC power source and the negative input of the op-amp is coupled to the electrical application.

15. The method of claim 14, wherein the drain of the MOSFET is coupled to the electrical application and the source of the MOSFET is coupled to the DC voltage source.

16. A brushless DC (BLDC) motor system having an electrical isolation circuit, the BLDC motor system comprising:
    a DC power source;
    a BLDC motor having a plurality of commutation switches configured to switch ON or OFF at predetermined intervals to control commutation of stator coils of the BLDC motor; and
    an electrical isolation circuit comprising:
    a switch coupled between the DC power source and the BLDC motor; and
    a comparator for controlling the switch by receiving inputs from the DC power source and the BLDC motor,
    wherein the comparator causes the switch to switch OFF when a voltage from the electrical application rises above a voltage from the DC power source, thereby preventing flow of current from the BLDC motor to the DC power source.

17. The BLDC motor system of claim 16, wherein the comparator causes the switch to switch ON when the DC power source has a higher voltage than the BLDC motor.

18. The BLDC motor system of claim 16, wherein the switch comprises a MOSFET having a gate, drain and source and wherein the comparator comprises an op-amp having a positive input, a negative input and an output.

19. The BLDC motor system of claim 18, wherein the output of the op-amp is coupled to the gate of the MOSFET, the positive input of the op-amp is coupled to the DC power source and the negative input of the op-amp is coupled to the electrical application.

20. The BLDC motor system of claim 19, wherein the drain of the MOSFET is coupled to the plurality of commutation switches of the BLDC motor and the source of the MOSFET is coupled to the DC voltage source.

* * * * *

UNITED STATES PATENT AND TRADEMARK OFFICE
CERTIFICATE OF CORRECTION

| | | |
|---|---|---|
| PATENT NO. | : 7,800,322 B2 | Page 1 of 1 |
| APPLICATION NO. | : 11/520842 | |
| DATED | : September 21, 2010 | |
| INVENTOR(S) | : Chuah et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 650 days.

Signed and Sealed this
Fifteenth Day of February, 2011

David J. Kappos
*Director of the United States Patent and Trademark Office*